United States Patent [19]

Shirai et al.

[11] Patent Number: 4,757,490
[45] Date of Patent: Jul. 12, 1988

[54] MODULATION ABNORMALITY DETECTOR FOR OPTICAL SOUND-RECORDING SYSTEM

[75] Inventors: Hidemichi Shirai; Yoshio Ozaki, both of Shinagawa, Japan

[73] Assignee: Sony Corporation, Tokyo, Japan

[21] Appl. No.: 823,503

[22] PCT Filed: May 23, 1984

[86] PCT No.: PCT/JP84/00261

§ 371 Date: Jan. 21, 1986

§ 102(e) Date: Jan. 21, 1986

[87] PCT Pub. No.: WO85/05485

PCT Pub. Date: Dec. 5, 1985

[51] Int. Cl.⁴ .................... G11B 27/36; G11B 7/00
[52] U.S. Cl. .................... 369/54; 369/93; 369/119
[58] Field of Search ............... 369/54, 107, 119, 124, 369/125, 91–93, 104, 14, 116, 117; 358/347, 348

[56] References Cited

U.S. PATENT DOCUMENTS

| 1,975,279 | 7/1932 | Lindenberg . |
| 2,224,914 | 12/1940 | Kreuzer .................... 369/119 X |
| 2,468,047 | 11/1945 | Dimmick . |
| 3,197,574 | 7/1965 | Zane .................... 369/33 X |
| 4,076,969 | 2/1978 | Sacks .................... 369/91 X |
| 4,087,651 | 5/1978 | Taneda et al. . |

FOREIGN PATENT DOCUMENTS

| 49-90515 | 8/1974 | Japan . |
| 53-84505 | 7/1978 | Japan . |
| 53-116804 | 10/1978 | Japan . |
| 54-68202 | 6/1979 | Japan . |
| 55-12659 | 4/1980 | Japan . |

OTHER PUBLICATIONS

"Improved Noise-Reduction System for High Fidelity Recording", JMPE, vol. 29; No. 3, Sep. 37; pp. 310–316; Hasbrouck et al.
SMPTE Journal Article (Mosely et al.), vol. 87, No. 4, 1978.

Primary Examiner—Aristotelis M. Psitos
Attorney, Agent, or Firm—Lewis H. Eslinger

[57] ABSTRACT

In the present invention, there is provided an abnormality detector circuit for comparing a scanning width signal with an upper limit setting signal and a lower limit setting signal and detecting that a scanning width indicated by the scanning width control signal becomes larger than an upper limit scanning width indicated by the upper limit setting signal or becomes smaller than a lower limit scanning width indicated by the lower limit setting signal, whereby when a signal level of an electrical input signal indicative of an information to be recorded exceeds a proper range, this can be positively discriminated by an operator.

4 Claims, 3 Drawing Sheets

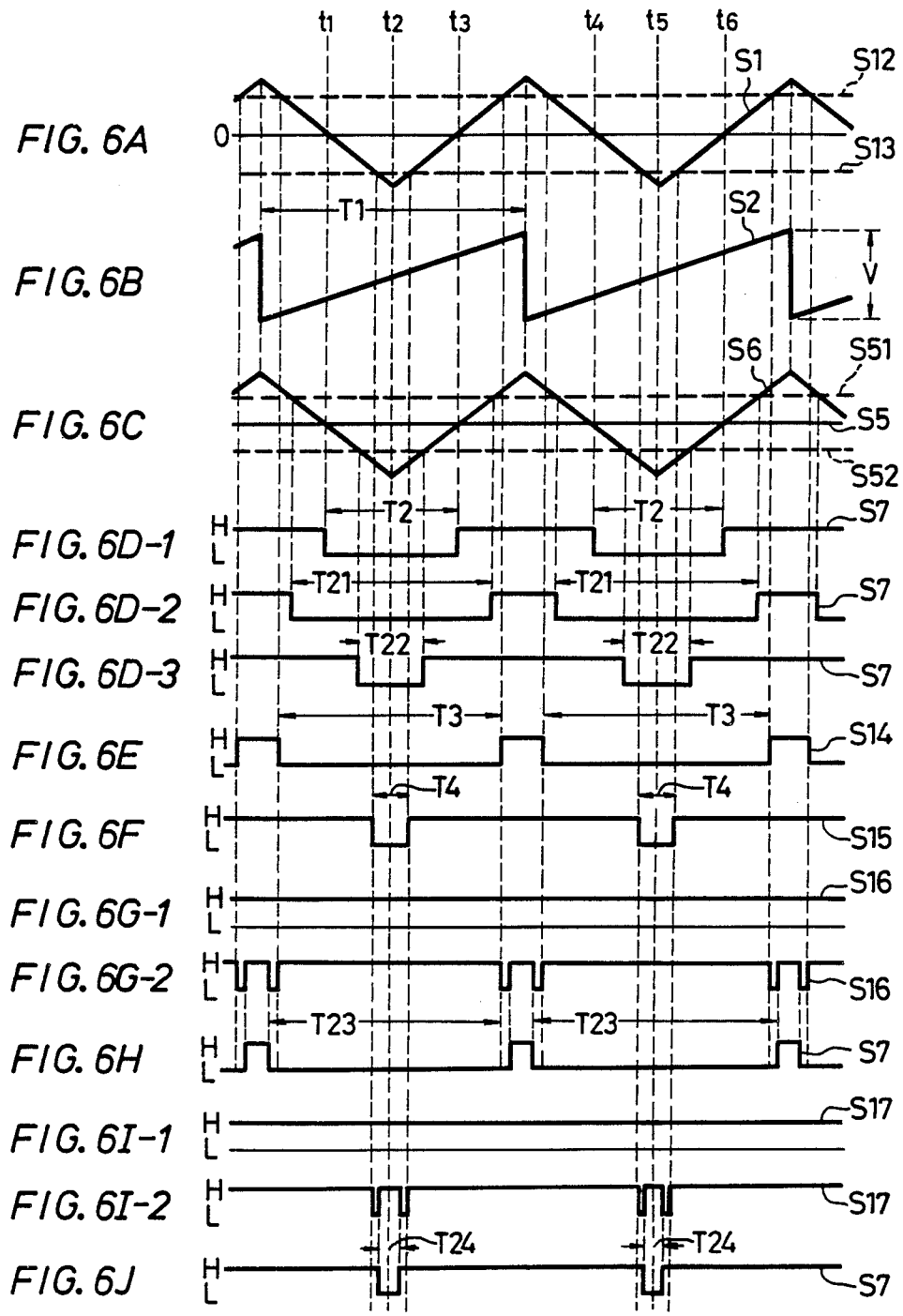

MODULATION ABNORMALITY DETECTOR FOR OPTICAL SOUND-RECORDING SYSTEM

DESCRIPTION

1. Technical Field

This invention relates to an information recording apparatus for exposing and recording an information on a film.

2. Background Art

As an information recording apparatus of this kind, there is known such one that exposes a sound signal on the sound track of a cinema film. The principle of the recording on the sound track is such that, as shown in FIG. 1, an optical image 1 having a triangular cross section is projected onto a slit 2 with a predetermined width to thereby form a linear exposing beam 3 by the light portion passed through this slit. Then, this exposing beam is irradiated on a sound track 4 as shown in FIG. 2. By moving the projected position of the triangular optical image 1 onto the slit 2 in the arrow 5 direction perpendicular to the slit 2 in response to the sound signal, the width of the exposing beam 3 is changed in accordance with the sound signal whereby, as shown in FIG. 2, an exposed locus 6 the exposed area of which is being changed in response to the sound signal is formed on the sound track 4 of the film.

By the way, in practice, in order to control the projected position of the triangular optical image 1 onto the slit 2 to be varied in response to the electrical sound signal, there is used a reflection apparatus of a galvanometer arrangement, in which the triangular optical image 1 emitted from the light source is reflected to become incident on the slit 2 by a reflection mirror which is mechanically rotated. The information recording apparatus including such mechanical system has a problem that it can not respond satisfactorily to the sound signal of a relatively high frequency region. In order to solve this problem, the prior art sound track recording apparatus is provided with an equalizer to increase the response property in the high frequency region as shown by a curve in FIG. 3 to thereby compensate for the response property in the high frequency region. However, from a practical arrangement, it is difficult to set this compensation to match individual characteristics of the mechanical system. In practice, the operator is always required to carry out a fine adjusting operation, which is very troublesome.

Normally, the mechanical system has a mechanical resonant point in a high frequency region (substantially in a range from 12 to 13 kHz). Accordingly, if an electrical input signal has a frequency component close to this resonant point, there occurs the fear that the mechanical system will resonate and hence the movable range of the triangular optical image 1 is expanded beyond that of the slit 2. This problem could be solved by the operator when he adjusts the recording level of the electrical input signal on the basis of his past experiences.

At any rate, the prior art information recording apparatus is not so arranged that it can check whether the signal level of the electrical input signal is a proper value or not. As a result, the adjusting work of the operator to provide a proper recording level was very difficult.

In view of the above mentioned points, this invention is made which is intended that when the signal level of an electrical input signal indicative of an information to be recorded exceeds a proper range, this can be properly detected by the operator.

DISCLOSURE OF INVENTION

According to this invention, there is provided an abnormality detecting circuit which compares a scanning width signal with an upper limit setting signal and a lower limit setting signal and detects that a scanning width indicated by the scanning width control signal becomes larger than an upper limit scanning width indicated by the upper limit setting signal or becomes smaller than a lower limit scanning width indicated by the lower limit setting signal, whereby when a signal level of an electrical input signal indicative of an information to be recorded exceeds a proper range, this can be accurately known to the operator.

BRIEF DESCRIPTION OF DRAWINGS

FIGS. 6A through 6J are signal waveform diagrams showing a signal at each section thereof and FIG. 7 is a connection diagram showing a detailed circuit arrangement of a modulation abnormality detector circuit.

BEST MODE FOR CARRYING OUT THE INVENTION

Figure 5:
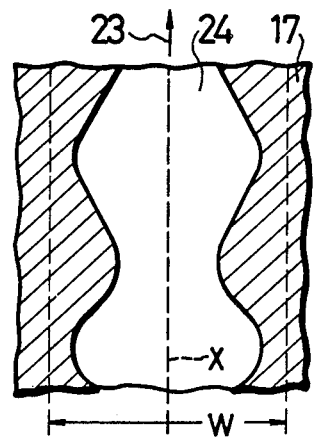
FIG. 5 is a schematic diagram showing an exposed locus thereof.
Figure 4:
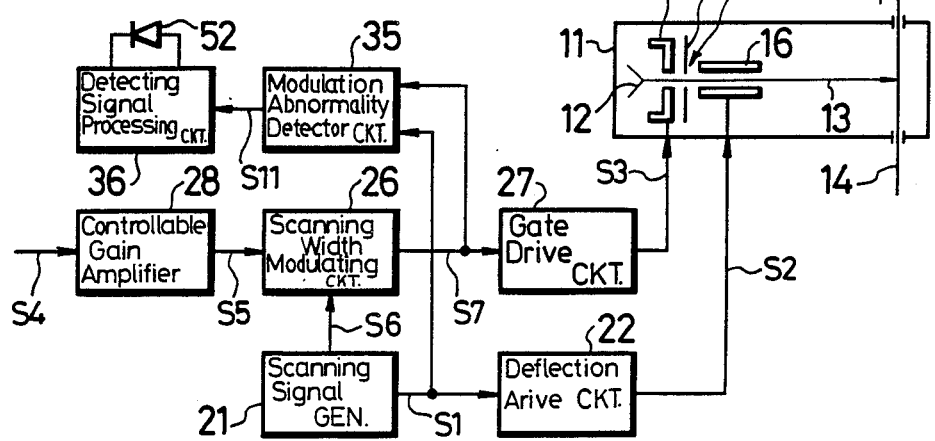
FIG. 4 is a block diagram showing an embodiment of an information recording apparatus according to the present invention.

An embodiment of an information recording apparatus according to this invention will hereinafter be described with reference to FIG. 4. In FIG. 4, reference numeral 11 designates a film exposing section which records an information by exposing a cinema film 14 by an electron beam 13 emitted from a cathode 12. The electron beam 13 is projected through a gate electrode 15 and a deflection electrode 16 to a sound track 17 (FIG. 5) of the film 14. To the deflection electrode 16, there is applied a sawtooth deflection signal S2 (FIG. 6B) generated from a deflection drive circuit 22 on the basis of a triangular wave signal S1 (FIG. 6A) having a high frequency (for example, 128 kHz) which is generated from a scanning signal generator 21, whereby at a predetermined cycle T1, which is the same as, that of the triangular wave signal S1, the electron beam 13 is made to scan the film 14 in its width direction perpendicular to its running direction (shown by an arrow 23) to draw an exposed locus 24 (FIG. 5).

An amplitude V (FIG. 6B) of the deflection signal S2 is selected to be such a value capable of scanning an effective width W (FIG. 5) of the sound track 17. Accordingly, the effective scanning interval formed of one cycle interval T1 of the deflection signal S2 (which is the same as the triangular wave signal S1) is made corresponding to the effective width W of the sound track 17, whereby the electron beam 13 at a ½ time point of the effective scanning interval T1 passes over the position of substantially the central line X of the sound track 17.

Figure 1:
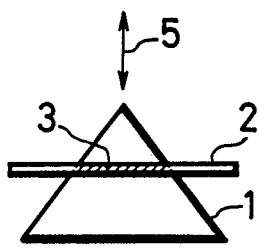
FIG. 1 is a schematic diagram showing a principle structure of a prior art sound track recording apparatus.

On the other hand, to the gate electrode 15, there is supplied a gate drive signal S3 produced at an output terminal of a gate drive circuit 27 that is controlled by a scanning width modulating circuit 26. The scanning width modulating circuit 26 compares an output signal S5 (FIG. 6C), which results from gain-controlling a sound input signal S4 by a controllable gain amplifier 28, with a reference signal S6 (FIG. 6C), which results from level-converting the triangular wave signal S1 (FIG. 6A) fed from the scanning signal generator 21 and produces a scanning width control signal S7 (FIG. 6D1) which falls down to a logic "L" level and which rises up to a logic "H" level at time points $t_1$ and $t_3$ at which the output signal S5 intersects the reference signal S6. Then, the gate drive circuit 27 generates the gate drive signal S3 whose drive potential is increased during the interval T2 (FIG. 6D1) in which the scanning width control signal S7 falls down to the logic "L" level and of which the drive potential is decreased during other intervals in which the scanning width control signal rises up to logic "H" level.

The potential when the gate drive signal S3 is increased is selected to be approximately the same as a potential (for example, $-20$ kV) of the cathode 12 of the film exposing section 11, whereby the electron beam 13 emitted from the cathode 12 travels through the gate electrode 15 and a small through-hole 30 formed through an anode 49 supplied with a high voltage (for example, $+20$ kV) and then reaches the film 14. On the other hand, the potential when the gate drive signal S3 falls down is selected to be a value (for example, in a range from $-30$ to $50$ V) considerably lower than the potential of the cathode 12, whereby the electron beam 13 emitted from the cathode 12 can be returned by the gate electrode 15 so as to be prevented from passing through the small through-hole 30. Accordingly, of the effective scanning interval T1, during the interval T2 in which the scanning control signal S7 is at the logic "L" level and the gate drive signal S3 is at high potential, the electron beam 13 can pass through the gate electrode 15 and can scan and expose the film 14 but can not scan and expose it during other remaining intervals.

Figure 2:
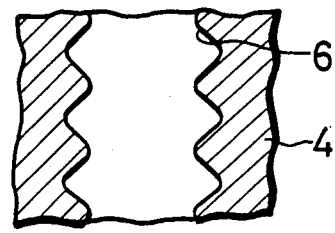
FIG. 2 is a schematic diagram showing an exposed locus thereof.
Figure 3:
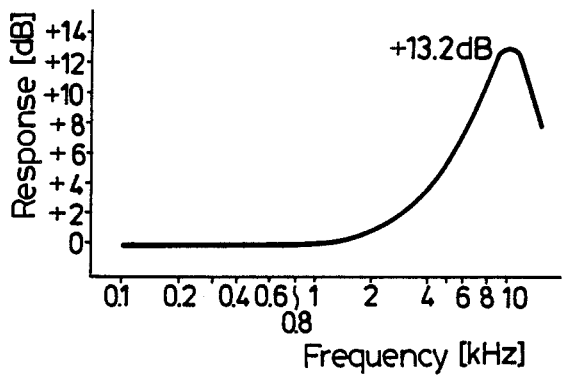
FIG. 3 is a characteristic graph showing a characteristic of an equalizer for FIG. 1.

By the way, since the signal level of the sound input signal S4 and the output signal S5 (FIG. 6C) change up and down with time as shown by broken lines S51 and S52, widths T21 and T22 of the interval T2 in which the scanning width control signal S7 is at the logic "L" level are changed in accordance with a momentary value of the sound input signal S4 as shown in FIGS. 6D2 and 6D3. In this connection, since the frequency of the triangular wave signal S6 is selected to be very high as compared with the frequency of the sound input signal S4, the change of the output signal S5 relative to the change of the triangular wave signal S6 can be considered substantially as the fluctuation of a DC level. Accordingly, the change of the falling-down width T2 of the scanning width control signal S7 is produced symmetrical across a time point $t_2$ that corresponds to the central point of the sound track. For example, if the signal level of the output signal S5 is fluctuated to S51 and S52 (FIG. 6C), in accordance therewith the falling-down widths T21 and T22 of the scanning width control signal S7 are symmetrically increased or decreased around the time point $t_2$ as shown in FIG. 6D2 or 6D3.

As a result, on the sound track 17 of the film 14, as shown in FIG. 5, there is recorded a scanning exposed locus 24 in which the scanning width thereof is symmetrically changed around the central line X in accordance with the change of the sound track input signal S4. In addition to the above mentioned circuit arrangement, the scanning width control signal S7 developed at the output terminal of the scanning width modulating circuit 26 is fed to a modulation abnormality detector circuit 35 and an abnormality detecting signal S11 therefrom is fed to a detecting signal processing circuit 36.

Figure 7:
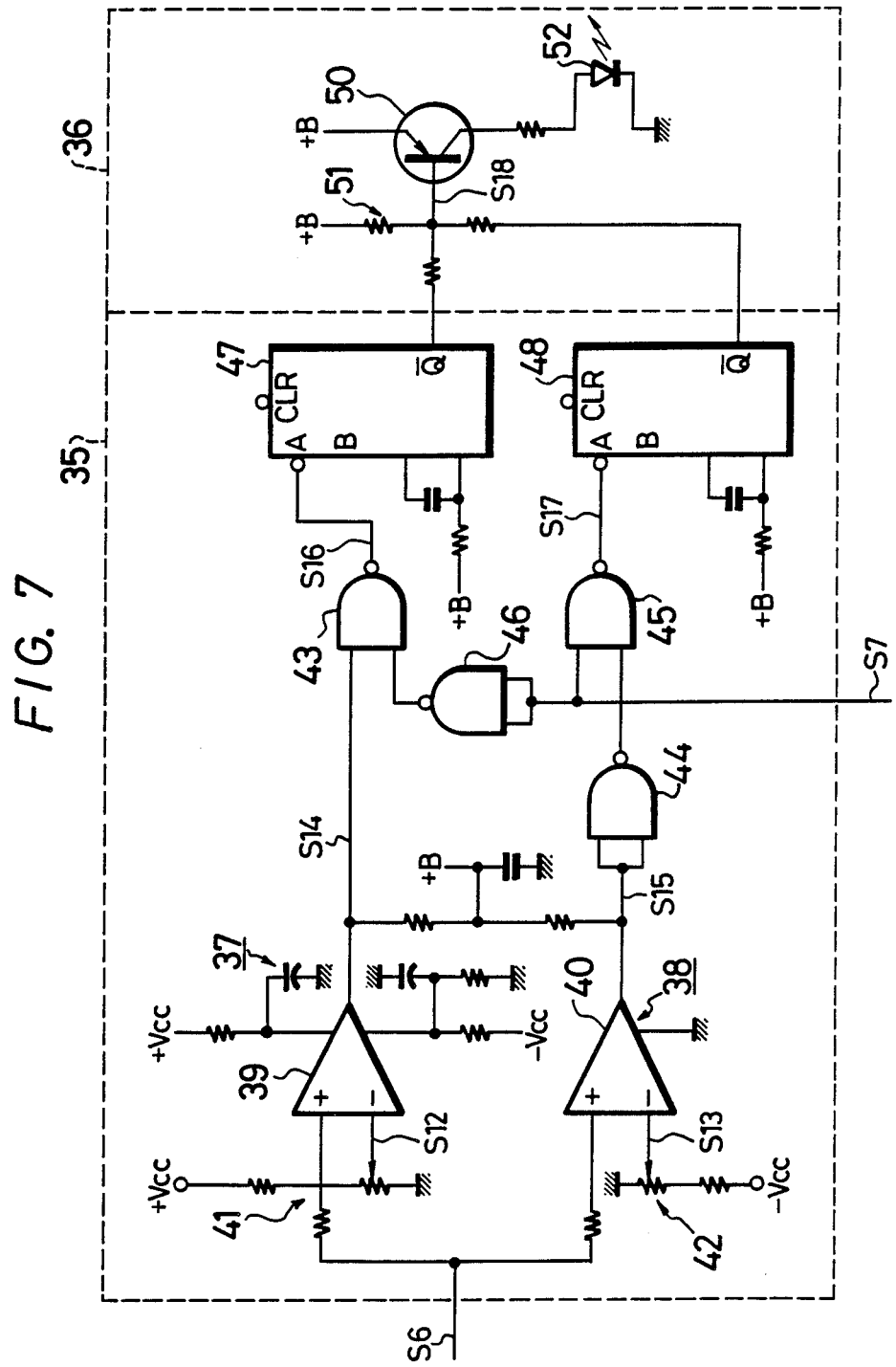

The modulation abnormality detector circuit 35 detects when the falling-down width T2 of the scanning width control signal S7 exceeds a predetermined upper limit value and a predetermined lower limit value and includes upper limit value and lower limit value setting circuits 37 and 38 as shown in FIG. 7. These setting circuits 37 and 38 include comparator circuits 39 and 40 which are supplied with the triangular wave signal S6 derived from the scanning signal generator 21 at their non-inverting input terminals and upper limit and lower limit reference signals S12 and S13 are supplied to inverting input terminals of the comparator circuits 39 and 40.

The upper limit reference signal S12 is given as the signal level of the positive voltage, from a resistance voltage dividing circuit 41 connected between a positive voltage source $+$Vcc and the ground, while the lower limit reference signal S13 is given as the signal level of the negative voltage from a resistance voltage dividing circuit 42 connected between a negative voltage source $-$Vcc and the ground. The level of the upper limit reference signal S12 is set to be a value corresponding to the position slightly inside the effective width W of the sound track 17 so as to remove a fear that the sound input signal S4 is increased and the exposed locus 24 exceeds the effective width W of the sound track 17. On the other hand, the level of the lower limit reference signal S13 is selected to be a value corresponding to the position slightly outside the central line X of the sound track 17 so as to prevent problems if the sound input signal S4 is decreased and the exposed locus 24 is made discontinuous at the position of the central line X.

Thus, during each cycle interval T1 (FIG. 6A) of the triangular wave signal S1, the upper limit value setting circuit 37 generates an upper limit setting signal S14 (FIG. 6E) which falls down to logic "L" level during an interval T3 in which the triangular wave signal S1 becomes lower than the upper limit reference signal S12, while the lower limit value setting circuit 38 generates a lower limit setting signal S15 (FIG. 6F) which falls down to logic "L" level during an interval T4 in which the triangular wave signal S1 becomes lower than the lower limit reference signal S13. In this connection, the interval T4 of the lower limit reference signal S13 means that a limit is set at the nearby position across the central line X of the sound track 17, while the interval T3 of the upper limit setting signal S14 means that a limit is set at the position near the effective width W across the central line X of the sound track 17.

The upper limit setting signal S14 is supplied to an upper limit verifying circuit 43 formed of a NAND circuit as one verifying input, while the lower limit setting signal S15 is inverted in logic level by an inverter 44 and then fed to a lower limit verifying circuit 45 formed of a NAND circuit as one verifying input. The upper limit verifying circuit 43 is supplied with another verifying input which results from inverting the scanning width control signal S7 of the scanning width modulating circuit 26 by an inverter 46. Whereas, the lower limit verifying circuit 45 is directly supplied with the scanning width control signal S7 as another verifying input thereof.

If as shown in FIGS. 6D1, 6D2 and 6D3 the falling down widths T2, T21 and T22 of the scanning width control signal S7 fall within the falling-down interval T3 of the upper limit setting signal S14 and also fall within the rising-up interval (other intervals than the interval T4) of the lower limit setting signal S15, since either one of the verifying inputs to the upper limit verifying circuit 43 becomes logic "L", it generates a verifying output S16 (FIG. 6G1) that is always logic "H", while since either one of the verifying inputs to the lower limit setting circuit 45 becomes logic "L", it generates a verifying output S17 (FIG. 6I1) that is always logic "H".

If on the other hand a falling-down width T23 of the scanning width control signal S7 is extended to be larger than the falling-down interval T3 of the upper limit setting signal S14 as shown in FIG. 6H, there occur intervals in which the verifying inputs to the upper limit verifying circuit 43 both become logic "H" so that the verifying output S16 becomes such that there are portions which fall down to logic "L" (FIG. 6G2). However, at that time, since either one of the verifying inputs to the lower limit verifying circuit 45 becomes logic "L", it continues to generate the verifying output of always logic "H".

If as shown in FIG. 6J, a falling down width T24 of the scanning width control signal S7 becomes shorter than the falling-down interval T4 of the lower limit setting signal S15, there occur intervals in which the verifying outputs to the lower limit verifying circuit 45 both become logic "H" so that in the verifying output S17 there appear parts which fall down to logic "L" (FIG. 6I2).

The verifying outputs S16 and S17 from the upper limit verifying circuit 43 and the lower limit verifying circuit 45 are supplied to abnormality detecting signal generator circuits 47 and 48 each formed of a retriggerable monostable multivibrator which are triggered at the falling-down edges of the verifying outputs S16 and S17 when they fall down from logic "H" level to logic "L" level. At that time, their $\bar{Q}$ outputs which become logic "L" during a predetermined limited time are supplied through a wired-OR circuit 51 to the base of a switching transistor 50 formed of a PNP type transistor in the signal processing circuit 36 as an abnormality detecting signal S18.

The signal processing circuit 36 is provided with a display element 52 formed, for example, of an LED connected to the collector of the transistor 50. Therefore, when the transistor 50 is turned on, the display element 52 is made to flash.

In the circuit arrangement mentioned above, if the signal level of the sound input signal S4 lies between the upper limit value and the lower limit value, the upper limit and lower limit verifying circuits 43 and 45 both generate the verifying signals S16 and S17 of logic "H", whereby neither of abnormality detecting signal generator circuits 47 and 48 are triggered so that the abnormality detecting signal S18 is at logic "H" level, thus turning off the transistor 50. Accordingly, the detecting signal processing circuit 36 does not allow the display element 52 to be made to flash.

If from this state the signal level of the sound input signal S4 is increased and the falling-down width of the scanning width control signal S7 is enlarged to be larger than the falling-down width T3 of the setting signal S14 from the upper limit value setting circuit 39, during the enlarged interval, the input signals to the upper limit verifying circuit 43 both rise up to logic "H" so that the verifying output S16 from the upper limit verifying circuit 43 falls down to logic "L" level (FIG. 6G2). Accordingly, the abnormality detecting signal generator circuit 47 is set, thus to turn on the transistor 50 in the signal processing circuit 36. At that time, the display element 52 is made to flash so that the operator can precisely learn that the signal level of the sound input signal S4 becomes abnormal. Therefore, the operator changes the gain of the controllable gain amplifier circuit 28 manually so as to reduce the scanning width T2 of the scanning width control signal S7 to a value not to exceed the upper limit value. Thus, it is possible for the operator to manually adjust the exposure scanning width so as not to be placed in the over-modulated state under which the exposure scanning width is modulated to exceed the effective width W of the sound track 17.

So far the responsive operation for the case in which the signal level of the sound input signal S4 is increased has been described as above. When the signal level of the sound input signal S4 is decreased and the falling-down width of the scanning width control signal S7 is reduced to be narrower than the falling-down width T4 of the setting signal S15 from the lower limit value setting circuit 45, during this shorter interval, the input signals to the lower limit verifying circuit 45 both become logic "H" so that the verifying output S17 from the lower limit verifying circuit 45 falls down to logic "L" level (FIG. 6I2). Accordingly, the abnormality detecting signal generator circuit 48 is set, thus turning on the transistor 50 in the signal processing circuit 36. Also in this case, the display element 52 is made to flash thereby to enable the operator to learn of the occurrence of the abnormality. Therefore, the operator can carry out the manual adjustment to control the gain of the controllable gain amplifier circuit 28 so that the scanning width of the scanning width control signal S7 is enlarged to be a value larger than the lower limit, thus to prevent the recording level from being lowered excessively to make the exposure locus 24 discontinuous.

Therefore, according to the structure shown in FIGS. 4 and 7, when the exposure locus 24 to the sound track 17 is enlarged abnormally or is made discontinuous, this state is positively detected and then made known to the operator, so that the work of adjusting the recording level can be made very easy as compared with the prior art case.

While in the above the display element 52 is made to flash to inform the operator of the occurrence of the abnormality and the operator adjusts the level of the sound input signal by the manual operation, instead thereof it may be also possible that the detecting signals from the abnormality detecting signal generator circuits 47 and 48 are directly fed back to the controllable gain amplifier 28 as the gain control signal thereby to return the signal level of the output signal S5, which will be fed to the scanning width modulating circuit 26, to the upper limit value or lower limit value. If arranged as above, the adjusting work done by the operator can be made much easier.

While in the above description the sound information is exposed and then recorded on the sound track of the cinema film, other informations, such as, digital data and so on, may be recorded thereon.

While in the above the electron beam is used as the exposing beam, this invention can be applied to other cases in which a laser beam and an optical beam are used as the exposing beam.

According to the present invention as set forth above, when the width of the scanning width control signal for the beam used to carry out the exposure recording on the film becomes wider than the predetermine upper limit value or narrower than the predetermined lower limit value, this is detected and the signal level of the input signal can be adjusted so that the exposure recording can be carried out more easily with the appropriate scanning width.

What is claimed is:

1. An information recording apparatus in which an exposing beam scans a film, said exposing beam being formed by a scanning width control signal modulated in accordance with an input signal, to form on said film an exposing locus whereby said input signal is recorded on said film, characterized by a modulation abnormality detector circuit which compares said scanning width control signal with an upper limit setting signal and a lower limit setting signal and which detects when a scanning width indicated by said scanning width control signal becomes larger than an upper limit scanning width indicated by said upper limit setting signal or becomes smaller than a lower limit scanning width indicated by said lower limit setting signal and which produces a detection signal indicating a result of the detection, wherein said modulation abnormality detector circuit includes first and second comparator means having respective noninverting inputs connected to said scanning width control signal and respective inverting inputs connected to positive and negative voltage sources for producing an upper limit setting signal and a lower limit setting signal, respectively, and logic circuit means receiving said scanning width control signal modulated in accordance with said input signal and said upper and lower limit setting signals for producing said detection signal, and wherein said logic circuit means includes a first invertor receiving said scanning width control signal modulated in accordance with said input signal, a second invertor receiving said lower limit setting signal from said second comparator means, a first NAND gate receiving said upper limit setting signal from said first comparator means and an output from said first invertor, a second NAND gate receiving said scanning width control signal modulated in accordance with said input signal and an output of said second invertor, and first and second monostable multivibrator circuits connected to be triggered by respective outputs of said first and second NAND gates, the output of said first and second multivibrator circuits being added together to form said detection signal.

2. An information recording apparatus according to claim 1, further comprising indicator means responsive to said detection signal from said modulation abnormality detector circuit for producing an indication when said scanning width control signal is larger than said upper limit and smaller than said lower limit.

3. An information recording apparatus according to claim 2, wherein said indicator means comprises a visual indicator.

4. An information recording apparatus according to claim 3, wherein said visual indicator comprises a light emitting diode.

* * * * *